(12) United States Patent  
Rivera

(10) Patent No.: US 8,109,203 B1  
(45) Date of Patent: *Feb. 7, 2012

(54) KITCHEN APPARATUS FOR FOOD PREPARATION

(76) Inventor: John Rivera, Vero Beach, FL (US)

( * ) Notice: Subject to any disclaimer, the term of this patent is extended or adjusted under 35 U.S.C. 154(b) by 1024 days.

This patent is subject to a terminal disclaimer.

(21) Appl. No.: 11/850,986

(22) Filed: Sep. 6, 2007

Related U.S. Application Data

(63) Continuation-in-part of application No. 11/269,920, filed on Nov. 9, 2005, now Pat. No. 7,442,025.

(60) Provisional application No. 60/669,609, filed on Apr. 8, 2005.

(51) Int. Cl.  
*A47J 43/18* (2006.01)  
*A21C 11/12* (2006.01)

(52) U.S. Cl. ............... 99/349; 99/354; 99/439; 99/428; 99/442; 425/408; 425/409; 425/193; 425/195

(58) Field of Classification Search .............. 99/349, 99/354, 353, 439, 428, 440, 442; 425/408, 425/409, 233, 234, 441, 442, 193, 195; 100/234, 100/243, 233, 244  
See application file for complete search history.

(56) References Cited

U.S. PATENT DOCUMENTS

| | | | | |
|---|---|---|---|---|
| 1,648,335 A | * | 11/1927 | Cole | 99/374 |
| 2,469,595 A | * | 5/1949 | Foster | 99/374 |
| 3,280,724 A | * | 10/1966 | Kavanagh | 99/424 |
| 3,831,507 A | * | 8/1974 | Wheaton | 99/428 |
| 5,253,565 A | * | 10/1993 | Burton | 99/374 |
| 7,395,753 B2 | * | 7/2008 | Dorion | 99/495 |
| 7,513,767 B2 | * | 4/2009 | Caboverde | 425/318 |

* cited by examiner

*Primary Examiner* — Reginald L Alexander  
(74) *Attorney, Agent, or Firm* — Allen Dyer Doppelt Milbrath & Gilchrist

(57) ABSTRACT

An apparatus for preparing tostones, referred to herein as a tostonera, has a base member with an upper surface including a plurality of concave recesses therein and a relatively planar bottom surface. A first press member is connected to the base member along a first periphery, and has a plurality of punches equal in number and co-located with the plurality of concave recesses. The first press member hingedly connected to the base member is capable of engaging the base member when pressure is applied to the first press member. A second press member hingedly connected to the base member along a second periphery, has at least one depression therein. The depression within the second press member may be configured to permit either a series of tostones or an entire half banana to be pressed at a single time.

18 Claims, 15 Drawing Sheets

KITCHEN APPARATUS FOR FOOD PREPARATION

RELATED APPLICATION

This application claims priority from U.S. patent application Ser. No. 11/269,920, filed on Nov. 9, 2005, now U.S. Pat. No. 7,442,025 from provisional application Ser. No. 60/669,609 which was filed on Apr. 8, 2005, and from a second provisional application Ser. No. 60/824,690, which was filed on Sep. 6, 2007, all of which are incorporated herein by reference in their entireties.

FIELD OF THE INVENTION

The present invention relates to the field of kitchen implements and, more particularly, to an implement a Latin American/Caribbean food prepared from plantains and known as "tostones."

BACKGROUND OF THE INVENTION

Tostones is a Caribbean and Latin American dish which consists of twice-fried green plantains or green bananas. A plantain is a large fruit resembling a banana, but larger, and botanically classified in a different species from regular bananas. Plantains are employed in making several different Caribbean and Latin American food recipes, including soups.

A tostón (singular) or tostones (plural) is a food made, typically, from green plantains. The plantains are peeled and cut into rounds of perhaps about one inch thick, although the specific thickness depends on the preference of the chef. The cut rounds are then deep fried until they begin to show a golden color. They are then removed from the oil, cooled a bit, and flattened by pressing down on them. Individual cooks have their own ways of flattening the plantain rounds into tostones, and there are many different approaches to this operation. Some will use a dish, a cup, a can, a flat-bottomed bottle, and any other available and suitable device. Some will put the partially fried tostones between two layers of brown paper bag material, such as brown paper grocery bags, and flatten the tostones by pounding down on them with a closed fist. Some will use an old device called a tostonera, which is a small press having two flat members connected to each other by a hinge. The tostón is placed between the flat members of the tostonera and squashed until it is approximately half an inch thick, again the thickness depending on preference of the cook. Once flattened, the tostones are returned to the hot oil and deep fried once more until they become crisp and turn a golden-brown color. Tostones are typically served as a side dish with meats and seafoods, and are often garnished with a garlic-citrus sauce called mojo.

SUMMARY OF THE INVENTION

To date, the only available type of implement for making tostones has been the tostonera. The tostonera is a simple press, having either flat or textured surfaces between which to flatten the tostones into their traditional shape. This old device provides limited utility, since the cook cannot easily prepare variations on the main theme of tostones. Therefore, it would be of advantage to provide a kitchen implement which could easily produce not only the traditional tostones, but also tostones having a different shape which could lead to the development of new recipes.

The present invention, an improved tostonera is shown in FIGS. 1-6. It is a double-sided press which when used on a first side produces traditional tostones, but when used on the second side produces tostones having a depression in the middle and suitable for being filled with another food, for example, shredded beef, small pieces of lobster, cut shrimp, or any other desired filling. These tostones are, essentially, shaped as small cups, as illustrated in FIGS. 5-6. They make ideal appetizers and provide opportunities for the creation of many new recipe combinations. Furthermore, the tostonera of the present invention may be dimensioned to provide for the pressing of multiple tostones simultaneously, which will greatly aid in the commercial production of tostones in restaurant kitchens. Those skilled in the culinary arts will recognize that while the present invention is primarily described for use in making tostones, any type of soft or semi-soft, moldable food may be pressed in the device, for example, dough for bread or for cookies.

The present device comprises three members which, solely for purposes of identification are designated as two outer members, and a middle member, or as press members and base member. As shown in FIGS. 2-3, the middle member serves as the base member against which an outer member presses when processing food. On one side of the tostonera the first outer member has a flat or textured surface which moves toward an opposing surface of the middle member when pressing. The opposing surface of the middle member may have one or more circular areas which generally define where the tostones will be pressed. On the other side of the tostonera, the second outer member has one or more protrusions which when the press is closed fit into one or more complementary depressions formed in the middle member, as shown in FIGS. 3-4. Protrusions on the second outer member are preferably rounded, ball-like knobs, and depressions in the middle member are preferably cylindrical, but both may be any shape desired, for example, for forming an ornamental design in the food being pressed, such as a star shape, a triangle, etc.

As noted briefly above, the tostonera press herein described may be fabricated in a size having multiple areas for pressing tostones. With such a press, a restaurant would be able to more rapidly prepare a large number of tostones, whether in their traditional shape or whether shaped as cups to be filled with any desired content.

In an alternative embodiment of the tostonera press, one side of the base member may have connecting circular depressions which would allow for lengthwise slices of a banana or plantain to be pressed. Thus, a full length of the banana may be used for sandwiches or in desserts.

BRIEF DESCRIPTION OF THE DRAWINGS

Some of the features, advantages, and benefits of the present invention having been stated, others will become apparent as the description proceeds when taken in conjunction with the accompanying drawings, presented solely for exemplary purposes and not with intent to limit the invention thereto, and in which.

DETAILED DESCRIPTION OF THE PREFERRED EMBODIMENT

The present invention will now be described more fully hereinafter with reference to the accompanying drawings, in which preferred embodiments of the invention are shown. Unless otherwise defined, technical and scientific terms used herein have the same meaning as commonly understood by one of ordinary skill in the art to which this invention pertains. Although methods and materials similar or equivalent to those described herein can be used in the practice or testing of the present invention, suitable methods and materials are described below. Any publications, patent applications, patents, and other references mentioned herein are incorporated by reference in their entirety. In case of conflict, the present specification, including any definitions, will control. In addition, the materials, methods and examples given are illustrative in nature only and not intended to be limiting. Accordingly, this invention may be embodied in many different forms and should not be construed as limited to the illustrated embodiments set forth herein. Rather, these illustrated embodiments are provided solely for exemplary purposes so that this disclosure will be thorough and complete, and will fully convey the scope of the invention to those skilled in the art. Other features and advantages of the invention will be apparent from the following detailed description, and from the claims.

Figure 1:
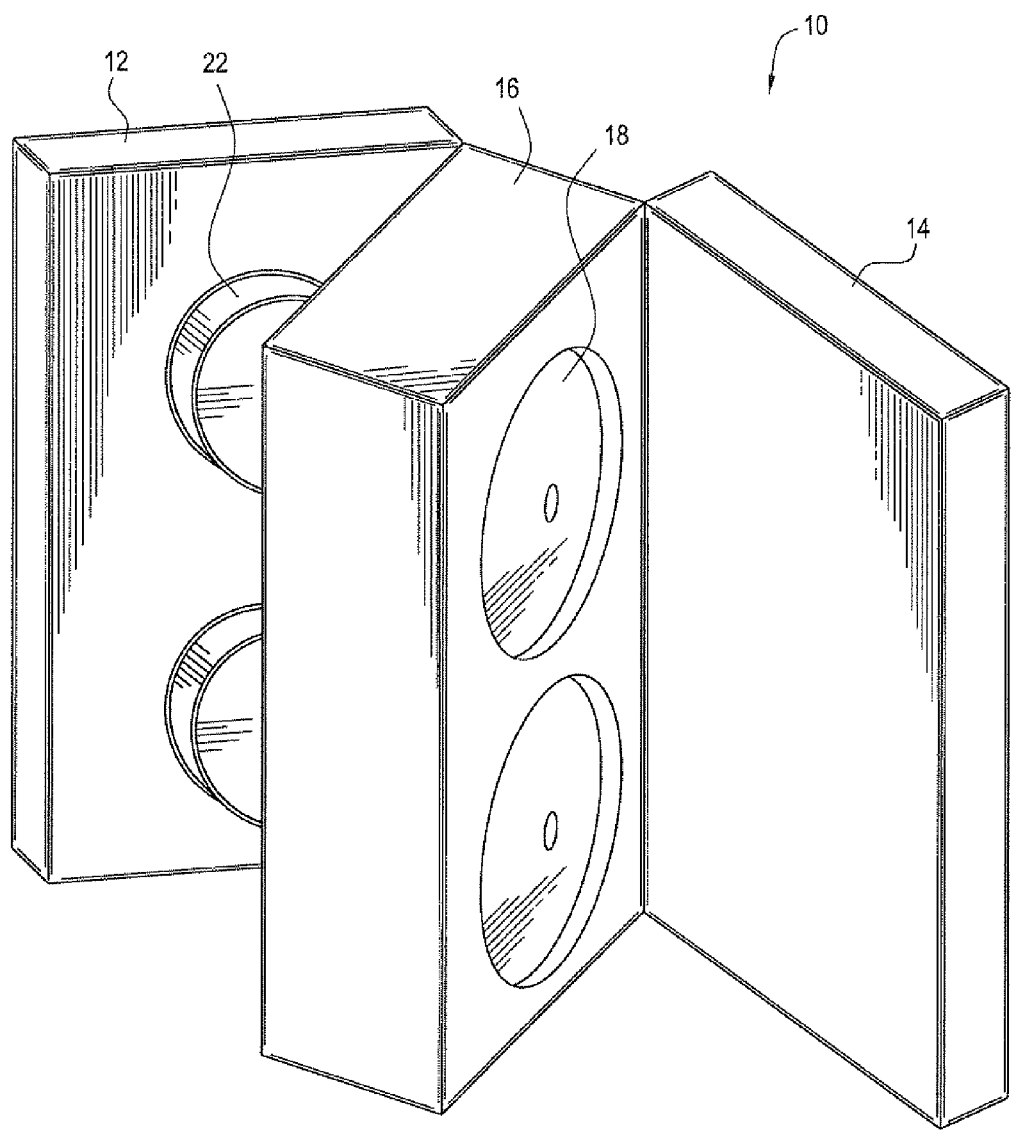
FIG. 1 is a standing perspective view of the tostonera press according to an embodiment of the present invention showing both sides of the press.
Figure 2:
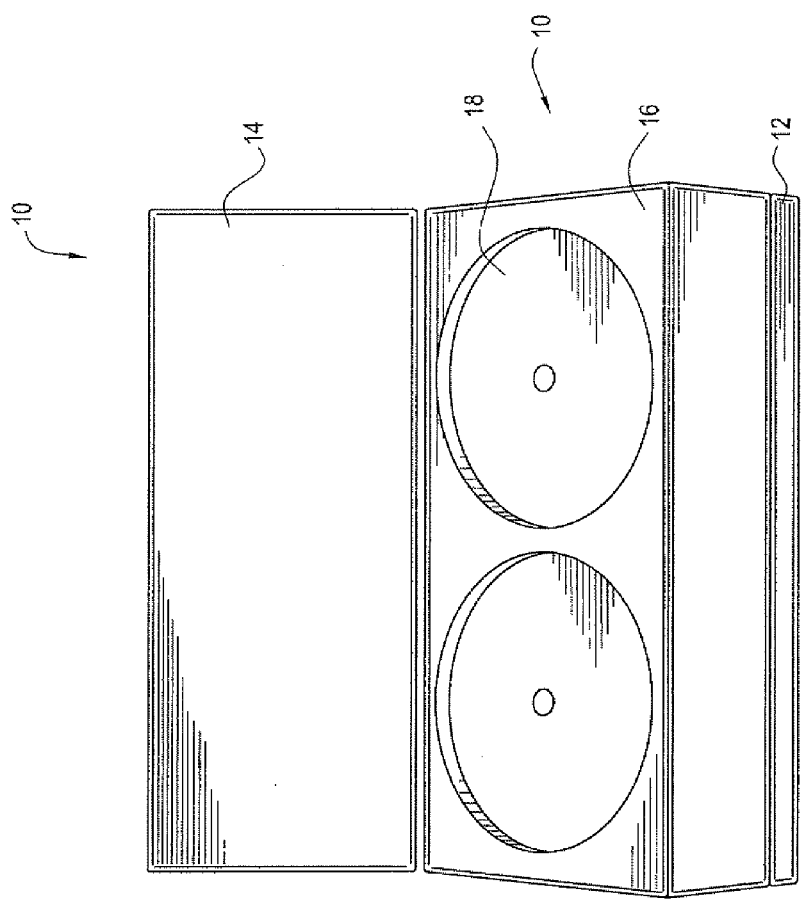
FIG. 2 depicts a front perspective view of a flat side of the press of FIG. 1.
Figure 3:
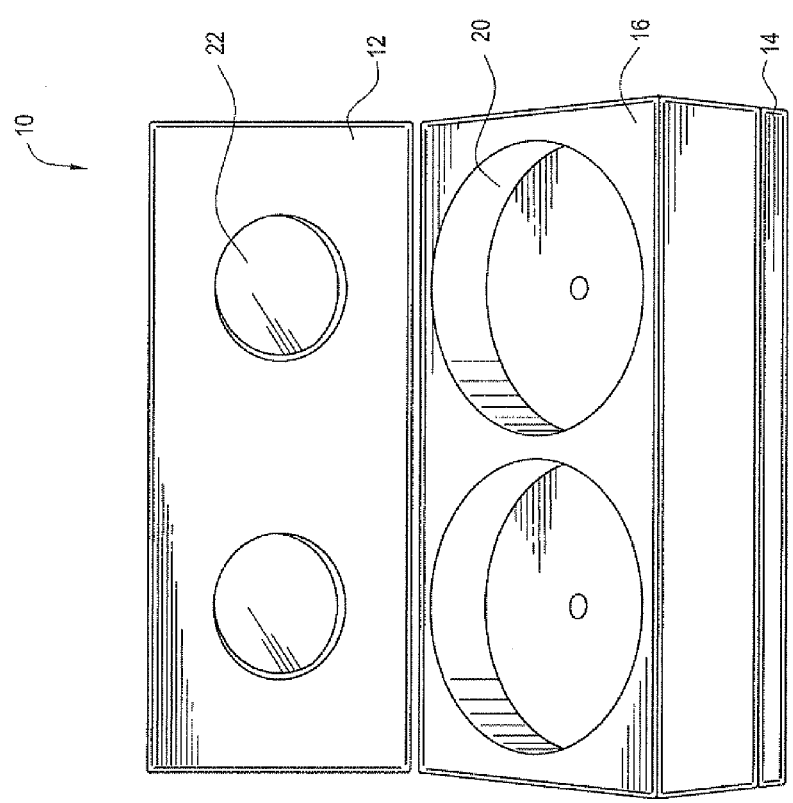
FIG. 3 is a front perspective view of a cup side of the press of FIG. 1.
Figure 4:
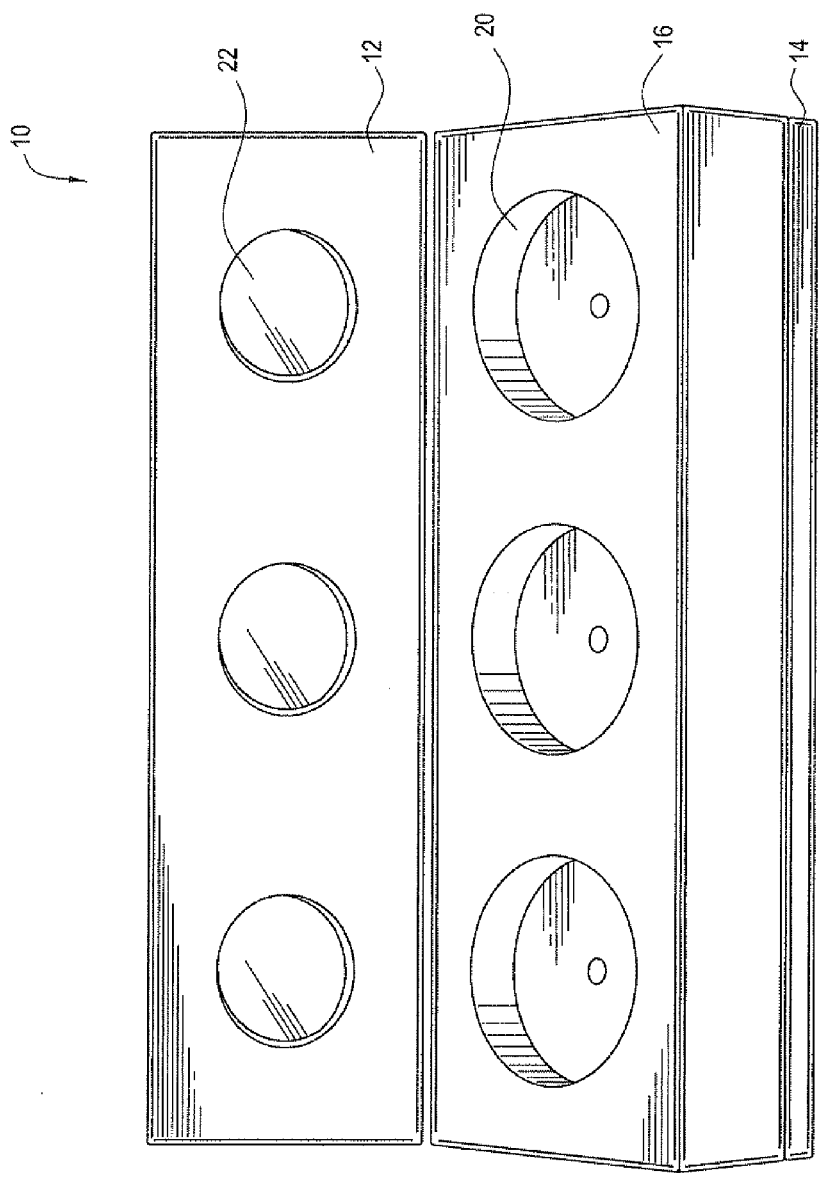
FIG. 4 shows a front perspective view of the press of FIG. 1 in a larger capacity model, showing the cup side of the press.
Figure 5:
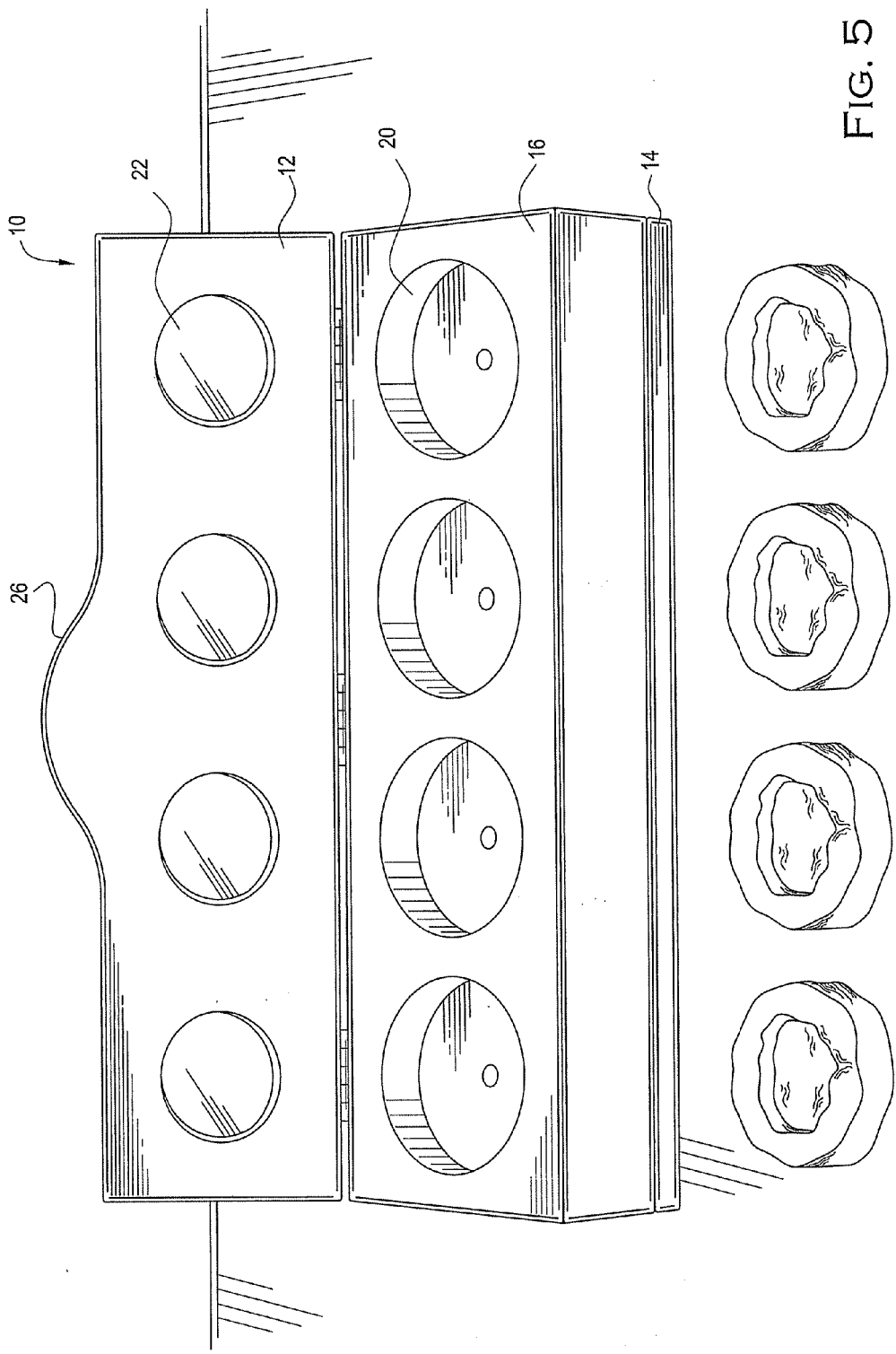
FIG. 5 shows cup-shaped tostones made with the tostonera press of the present invention.
Figure 6:
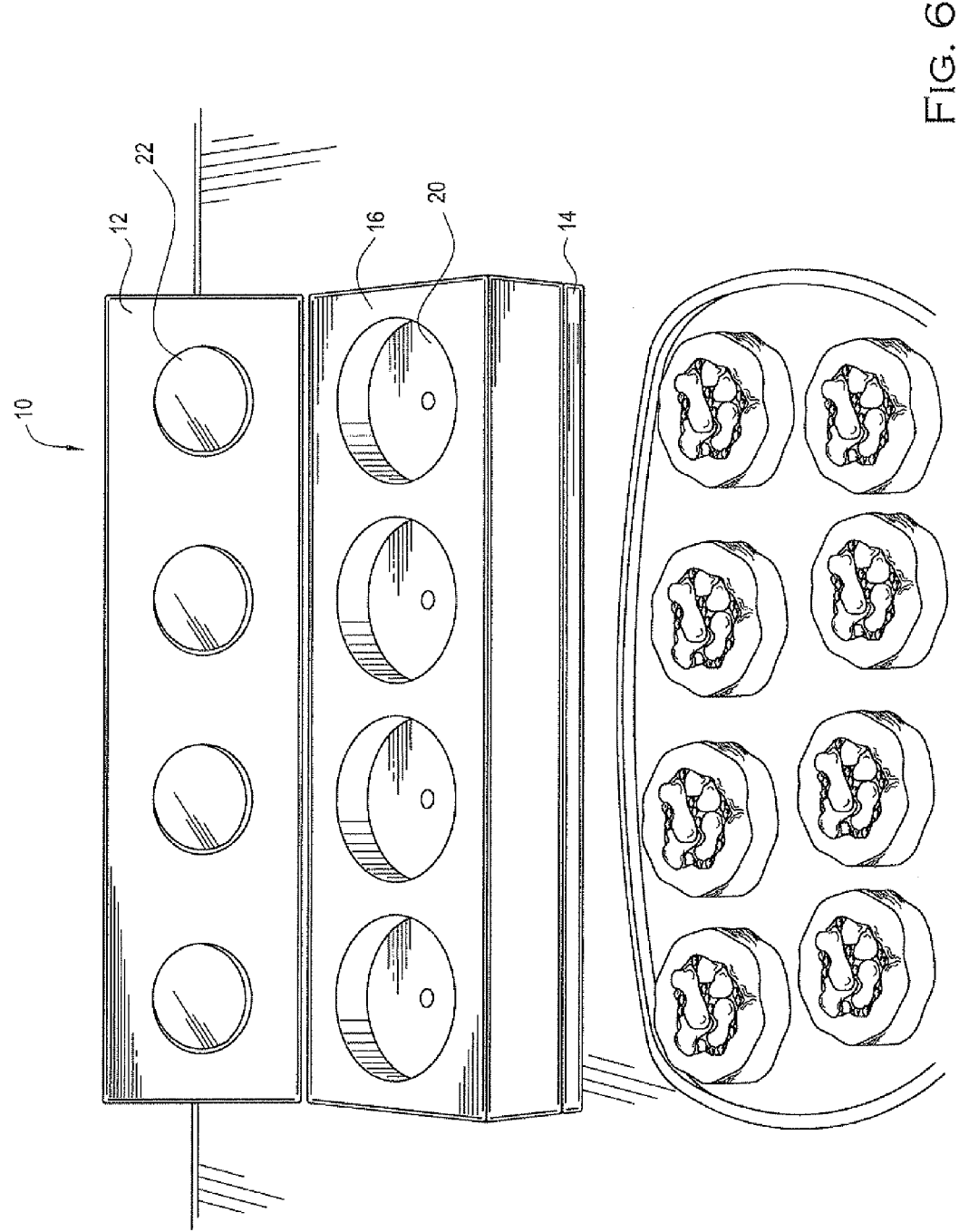
FIG. 6 depicts the cup-shaped tostones of FIG. 5 being filled for appetizers.

FIGS. 1-6 illustrate the improved tostonera 10 of the present invention. The present tostonera 10 comprises two press members 12, 14, a base member 16, one or more shallow recesses 18 in which to press classic flat tostones and one or more deep recesses 20 with mating punches 22 in which to press tostones which are cup shaped, as shown in FIGS. 5-6. A first press member 12, also called a first outer member, is preferably generally planar and is movably connected to a base member 16, also called herein a middle member. The movable connection may be by means of a hinge 24, as shown in FIGS. 5-6. Additionally, the movable connection may be by another method or device which permits the press or outer member to be closed against the base or middle member so as to press the food being prepared, the tostones. The base or middle member 16 has the first press member 12 movably associated therewith and also has a second press member 14 movably associated and opposite the first press member. The second press member 14 has one or more punches 22 projecting outwardly from a surface facing the base member 16. The implement includes one or more relatively shallow recesses 18 formed in the base member 16 facing the first press member 12. Additionally, one or more relatively deep recesses 20 are formed in the base member 16 facing the second press member 14, the one or more punches 22 matingly coupling therewith.

Yet other structural features of the present improved tostonera 10 include at least one handle 26 positioned on at least one of the first 12 and second 14 outer members. The handle may be an extension of the press or outer member, as shown in FIG. 5. For example, when the first and/or second outer members 12 14 are in a closed position relative to the middle member 16, they extend beyond the periphery of the middle or base member and this extension serves as a handle 26 for a user to work the press. Alternatively, the handle 26 may be a discrete handle connected to an outer press member 12 14. Those skilled in the art will understand that a handle 26 may be variously structured and positioned on the tostonera 10 device. The skilled will additionally recognize that the present tostonera 10 may be made of a synthetic material, may be made of wood, or may be made of any other material suitable for processing food.

Areas of the tostonera 10 wherein the plantain rounds are pressed include the plurality of relatively shallow recesses 18, which may be preferably approximately one half inch deep. These shallow recesses 18 may be lined with a non-stick material. On an opposite side of the present tostonera 10 are disposed a plurality of bowl-shaped recesses 20, which may also be lined with a non-stick material. The second outer member or second press member 14 is disposed with one or more punches 22 which are protrusions extending from a surface of the press member which faces the middle or base member 16. These punches 22 are generally complementary to the bowl-shaped relatively deep recesses 20 and the punches may even be weighted to aid in the pressing operation. In one preferred embodiment of the invention, the punch member 22 is dimensioned to occupy a central area in the bowl-shaped recess 20, so that cup-shaped tostones may be pressed, as shown in FIGS. 5 and 6.

In use, the improved tostonera 10 of the present invention is employed as follows. In making tostones, the first step is, typically, to peel and cut a desired number of green plantains into rounds. The skilled will understand that "green" plantains refers generally to plantains that are not yet ripe. If ripe plantains are used, the tostones will not come out right according to the traditional recipe. Ripe plantains are used for other Caribbean dishes but not usually for making tostones. The rounds are then fried to a slight golden color in hot oil or grease.

Following this first frying step, the rounds are removed from the hot oil and placed on a drainage medium such as paper towels, or brown paper material such as from grocery bags. After slight draining, the half-fried rounds are flattened into the typical shape of the tostones by pressing them. Cooks have various ways of pressing the tostones, as noted above. Some cooks will place the once-fried round between two brown paper grocery bags and pound on it with a closed fist in order to flatten it. Other cooks will use various objects for flattening the tostones, for example, soft drink bottles, rolling pins, cans, etc. In making cup-shaped tostones cooks will often use their thumb to create the desired depression. Because this has traditionally been a manual process, it is labor intensive and makes it difficult to produce tostones in the larger quantities often required in the restaurant and catering business.

Once the tostones are shaped by pressing, they are returned to the hot oil for a second frying step. When they are a golden brown, the finished tostones are removed from the fryer, drained and served while hot. Cup shaped tostones are used in creating hors d'ouvres by topping them with any desired filling, for example, shrimp cocktail, chicken salad, spiced ground beef, etc., as illustrated in FIG. 6.

Tostones have been made by traditional methods perhaps for hundreds of years. Simple presses have also been employed for making tostones. However, the present improved tostonera provides the ability to make either type of traditional tostones, the flattened type or the cup shaped type, and saves space by combining both implements into one device. Such a combination implement has not been previously described or suggested and is being welcomed in both private and commercial kitchens specializing in Latin American and Caribbean cuisine.

Figure 7:
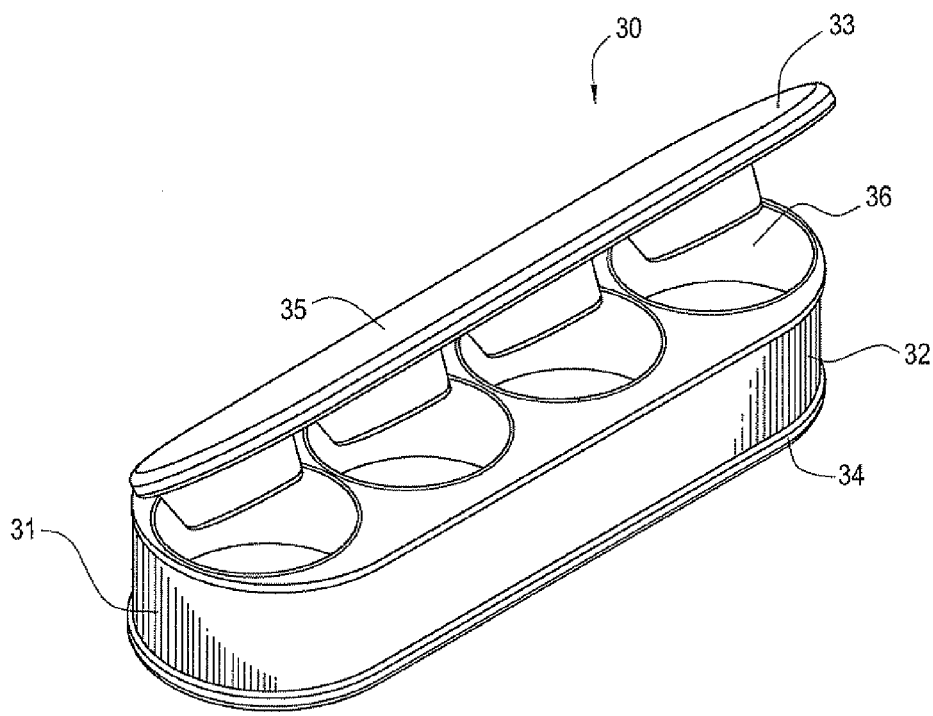
FIG. 7 is a detail view of the first press member of the oval-shaped tostonera of FIG. 7.

Referring to FIG. 7, an alternative embodiment of the tostonera 30 includes a three-part body 31 having a base member 32 residing between two press members 33, 34. The body 31 is constructed of a relatively smooth synthetic material, such as a plastic, Mylar, glass, or ceramic, for example, that preferably creates a non-stick surface. The base member 32 includes a plurality of recesses 36 therein and a relatively planar bottom surface (not shown). At least one handle (not shown) positioned on at least one of the first or second press members may also be included.

Figure 8:
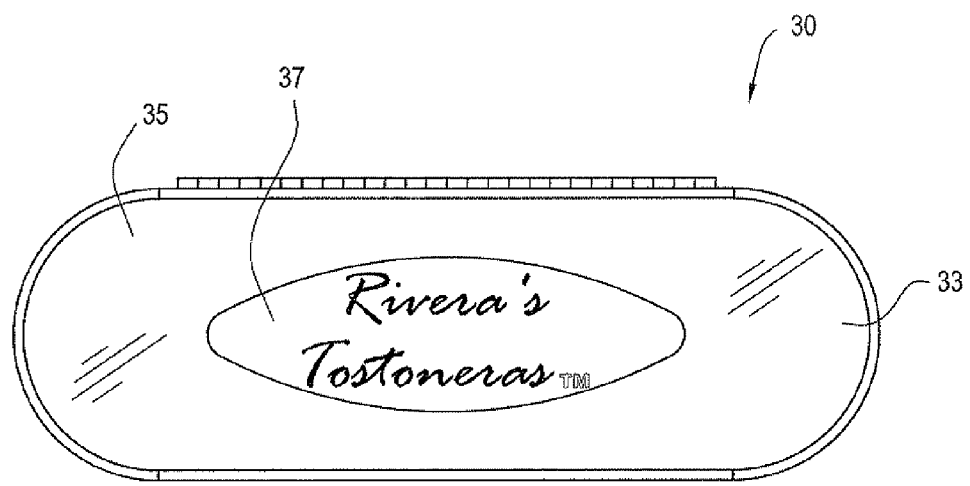
FIG. 8 is a view of the top surface of an oval-shaped tostonera having an area on the top of the first press member suitable for bearing indicia.

Referring to FIG. 8, the upper surface 35 of the first press member 33 has an area 37 that is suitable for bearing indicia, such as a trademark, logo, the name of the owner or a house brand, for example.

Figure 9:
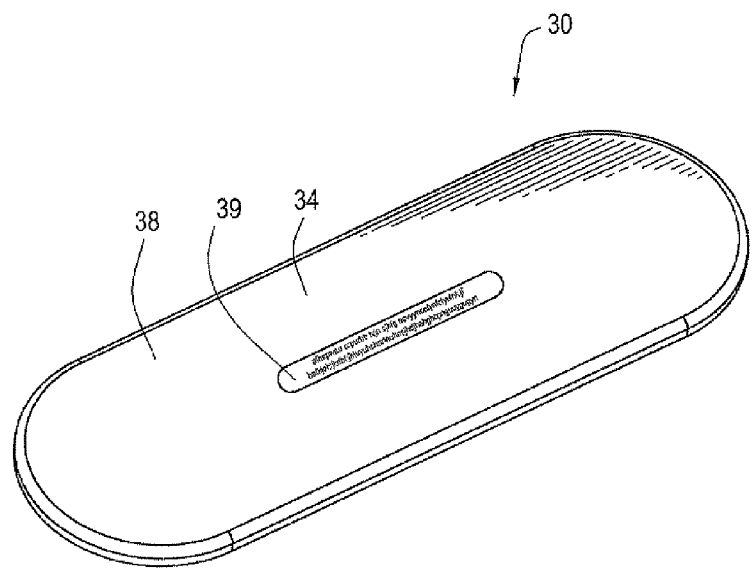
FIG. 9 is a view of the bottom surface of an oval-shaped tostonera having an area on the bottom of the second press member suitable for bearing indicia.

Referring to FIG. 9, the bottom of the tostonera 30, which is the bottom 38 of the second press member 34 has a second area 39 for bearing indicia.

Figure 10:
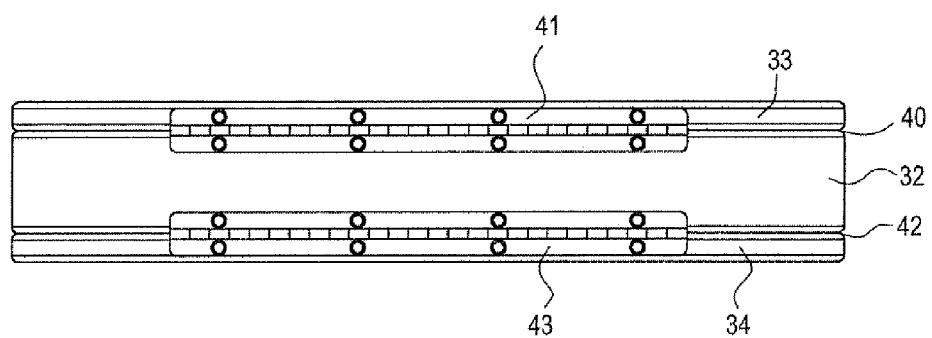
FIG. 10 is a side view showing hinge connections between the first and the base member along a first periphery and second press member and the base member along a second periphery.

Referring to FIG. 10, the first press member 33 is hingedly connected to the base member 32 along a first periphery 40 by at least one connector 41, such as a hinge, for example. The second press member 34 is also connected to the base member 32 along a second periphery 42 by at least one connector 43. The skilled will recognize that the connectors 41, 43 need not be limited to hinges, but may include any known device that provides such a connection. Moreover, it is also evident that more than one connector may be used.

Figure 11:
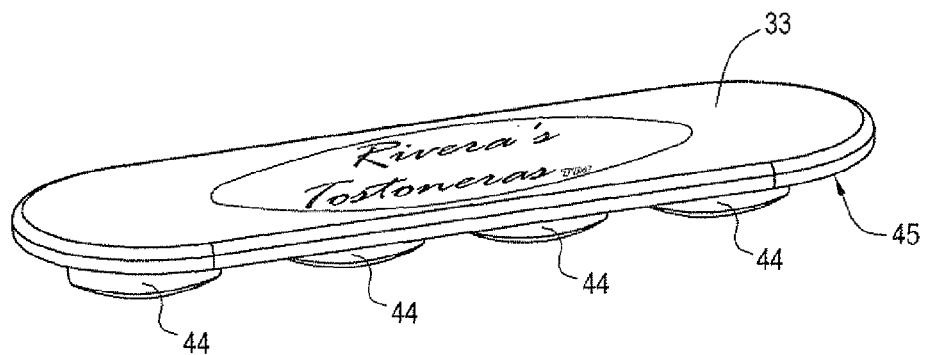
FIG. 11 is a detail view of the punches on the bottom surface of the first press member of the oval-shaped tostonera of FIG. 7.

Referring to FIG. 11, the first press member 33 has a plurality of punches 44 located on its bottom surface 45. These punches 44 may optionally be weighted, and have a relatively smooth surface to engage the food without having the food stick to its surface. This non-stick feature of the tostonera 30 may be accomplished either by the material of manufacture for the tostonera or by adding a non-stick coating (not shown), such as Teflon®, for example, to the working surfaces of the apparatus.

Figure 12:
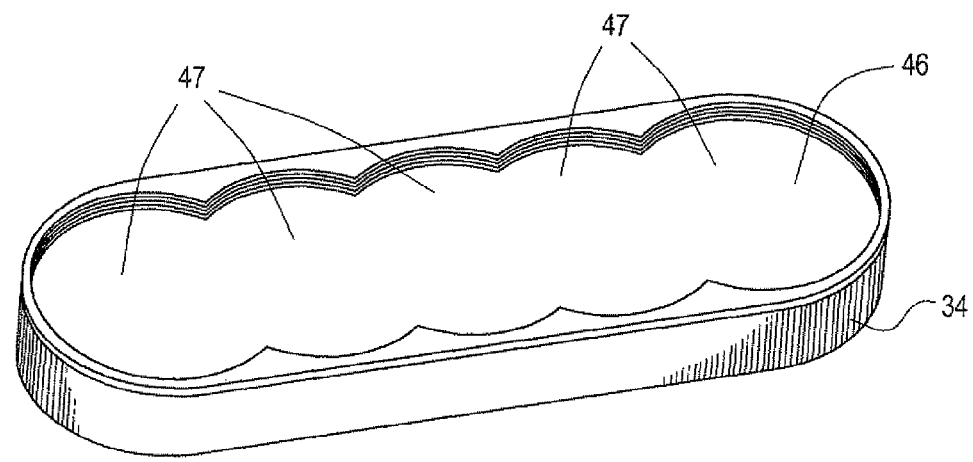
FIG. 12 is an isomeric view of the base member of the oval-shaped tostonera of FIG. 7.

Referring to FIG. 12, the second press member 34 has at least one depression 46 therein. The at least one recess second press member 34 may be configured in any manner, such as a rectangle 48, series of squares, but preferably includes overlapping circular depressions 47 capable of pressing an entire half banana. The plurality of serially overlapping circular depressions 47 on the second press member 34 may optionally be co-located with a complementary plurality of serially overlapping circular depressions (not shown) on the bottom of the base member 32.

Figure 13:
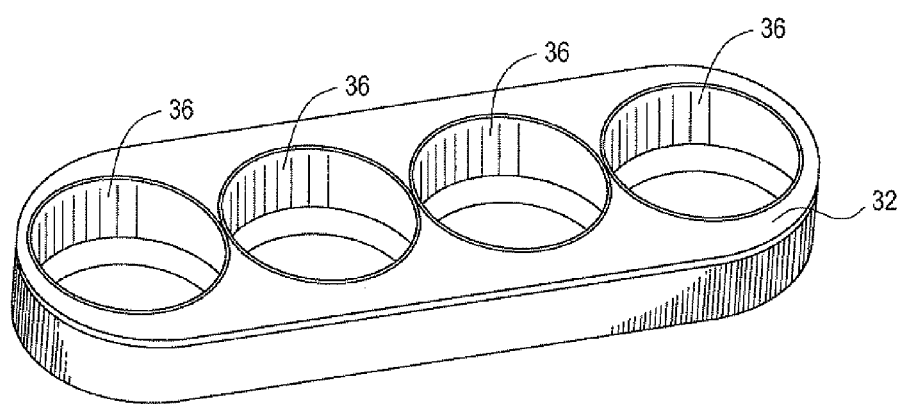
FIG. 13 is a isometric view the upper surface of the second press member of the oval-shaped tostonera of FIG. 7.
Figure 14:
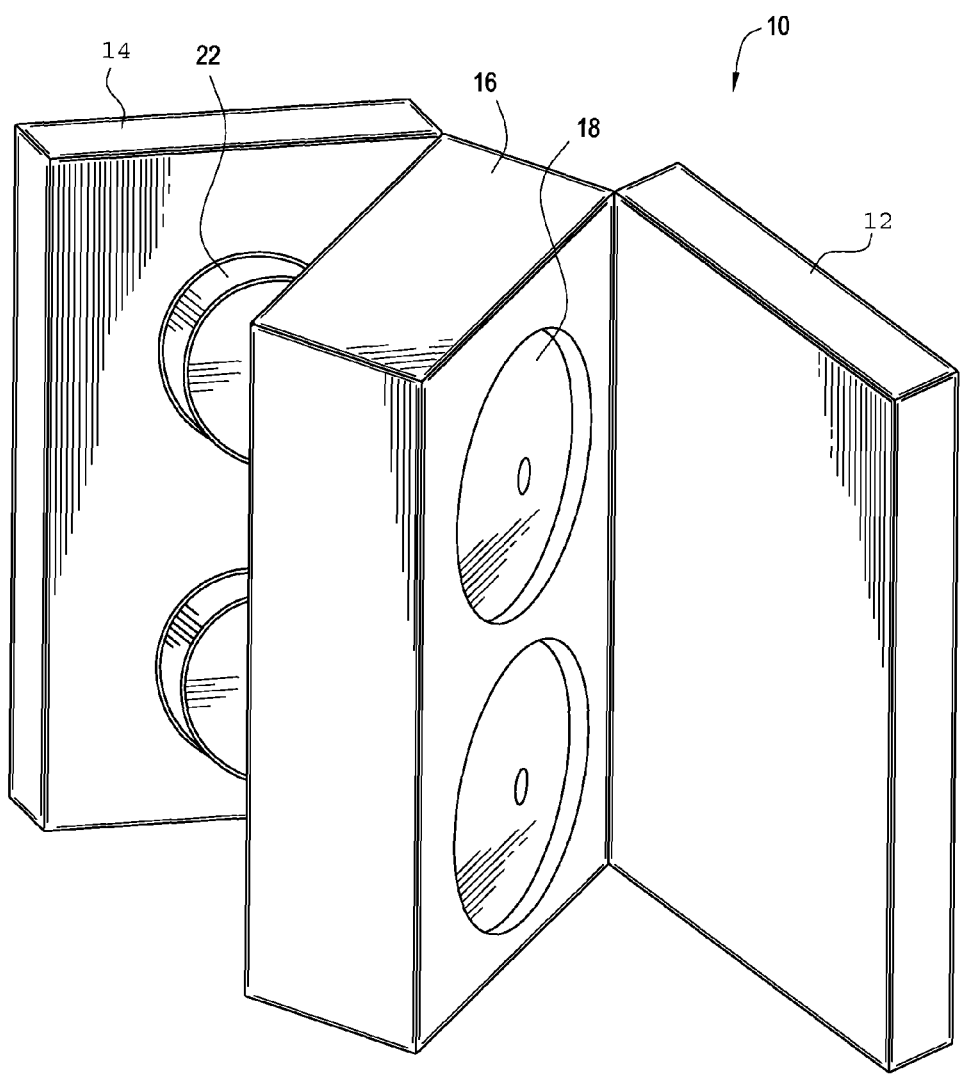
FIG. 14 shows the tostonera of FIG. 1 in perspective view having both sides open.
Figure 15:
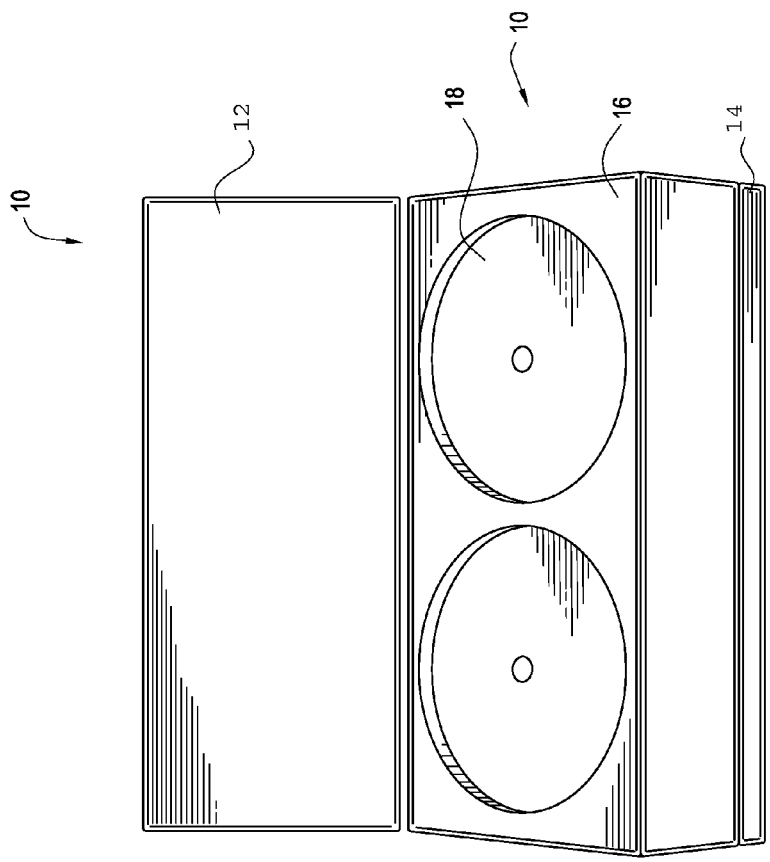
FIG. 15 provides a front perspective view of the tostonera of FIG. 1 having one side open.
Figure 16:
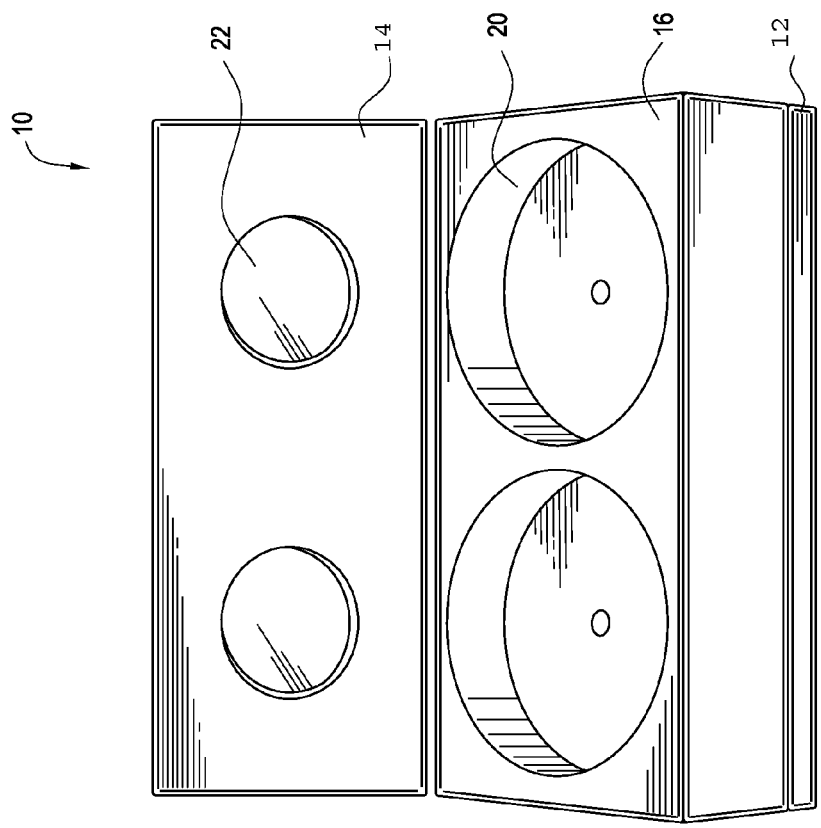
FIG. 16 shows the tostonera of FIG. 15 having the opposite side open.
Figure 17:
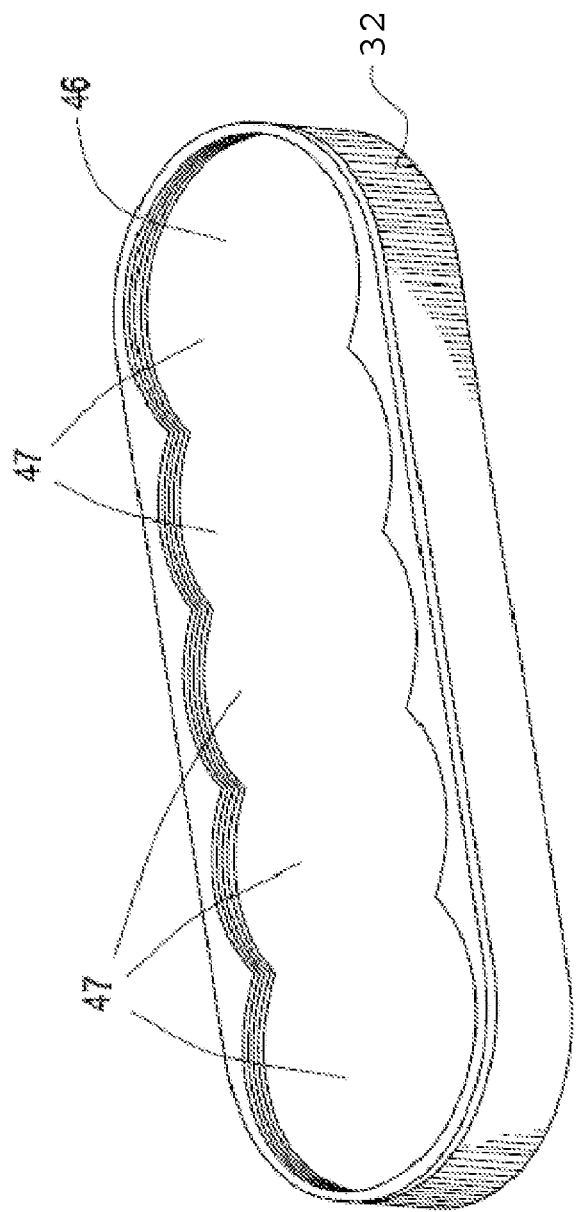
FIG. 17 depicts a perspective view of an alternate embodiment of the tostonera of FIG. 1.
Figure 18:
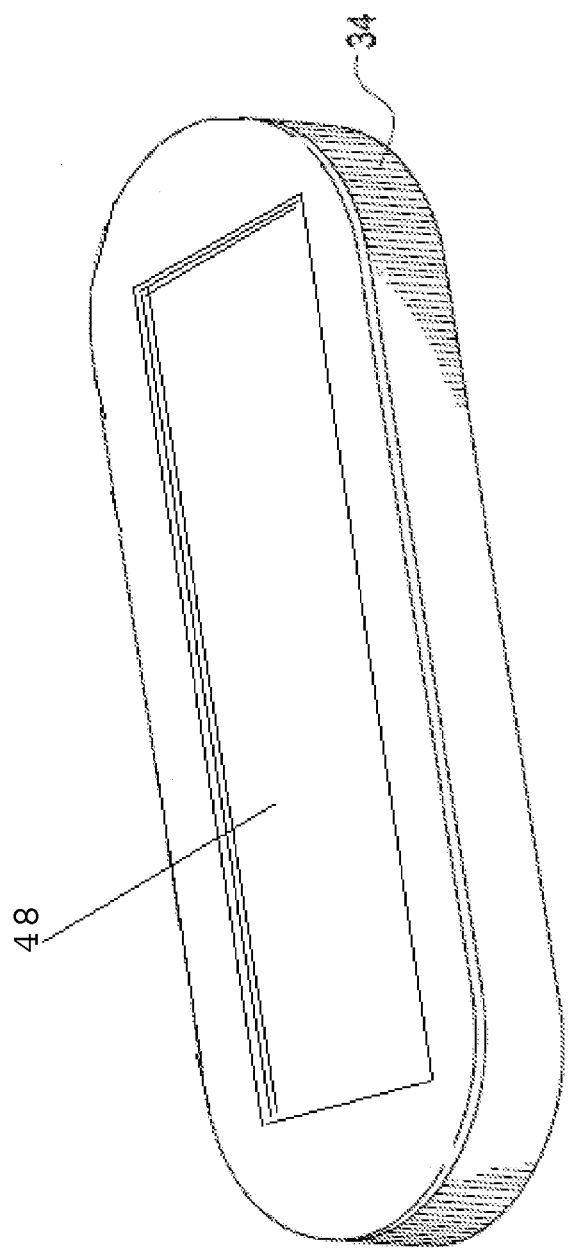
FIG. 18 illustrates an alternate embodiment of the tostonera of FIG. 17.

Referring to FIG. 13, the punches 44 are equal in number to the plurality of recesses 36 located in the base member 32 so that the punches may matingly engage the base member thereby. The recesses 36 may also be optionally coated with a non-stick coating (not shown), such as Teflon®, for example.

Accordingly, in the drawings and specification there have been disclosed typical preferred embodiments of the invention and, although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as recited in the appended claims.

That which is claimed:

1. A food preparation apparatus comprising:
    a base member having an upper surface including a plurality of recesses therein and a relatively planar bottom surface;
    a first press member hingedly connected to said base member along a first periphery of said upper surface and having a plurality of punches complementary to said plurality of recesses and matingly engaging said base member thereby; and
    a second press member hingedly connected to said base member along a second periphery of said bottom surface, said second press member having a plurality of overlapping depressions therein.

2. The implement of claim 1, further comprising at least one handle positioned on at least one of said first or second press members.

3. The apparatus of claim 1, wherein the upper surface of the first press member, and the bottom surface of said second press member have locations capable of bearing indicia.

4. The apparatus of claim 1, wherein said second press member having at least one depression therein includes overlapping circular depressions capable of pressing an entire half banana.

5. The apparatus of claim 1, wherein each member of said plurality of punch members is weighted.

6. The apparatus of claim 1, wherein said second press member having a plurality of overlapping depressions therein includes a plurality of serially, overlapping circular depressions.

7. The apparatus of claim 1, wherein the connected depressions in the second press member includes a plurality of serially overlapping circular depressions with a complementary plurality of serially overlapping circular depressions on the bottom of the base member.

8. The apparatus of claim 1, wherein the upper surface of the first press member, and the bottom surface of said second press member have locations capable of bearing indicia.

9. The apparatus of claim 1, wherein said apparatus further comprises a non-stick material.

10. The apparatus of claim 1, wherein said apparatus further comprises a synthetic material providing an essentially smooth surface.

11. A food preparation apparatus comprising:
    a base member having an upper surface including a plurality of concave recesses therein;
    a first press member hingedly connected to said base member along a first periphery, said first press member having a plurality of punches aligned opposite to the plurality of concave recesses; and a second press member hingedly connected to said base member along a second periphery, said second press member having at least one depression therein.

12. The apparatus of claim 11, wherein said at least one depression therein further comprises a single rectangular depression.

13. The apparatus of claim 11, wherein said at least one depression therein further comprises a series of overlapping circular depressions.

14. The apparatus of claim 11, wherein the upper surface of the first press member, and the bottom surface of said second press member have locations capable of bearing indicia.

15. A tostonera comprising:

a base member having an upper surface including a plurality of concave depressions therein and a relatively planar bottom surface;

a first press member hingedly connected to said base member along a first periphery, said first press member having a plurality of punches equal in number and co-located with said plurality of concave depressions so as to matingly engage said base member thereby; and a second press member hingedly connected to said base member along a second periphery, said second press member having a plurality of overlapping depressions therein.

16. The tostonera of claim 15, wherein said plurality of concave depressions in the base member and said plurality of overlapping depressions in second press member are circular.

17. The apparatus of claim 15, wherein said tostonera further comprises a non-stick material.

18. The apparatus of claim 15, wherein said tostonera further comprises a synthetic material providing an essentially smooth surface.

* * * * *